H. G. METZIG.
AUTOMOBILE WHEEL JACK.
APPLICATION FILED AUG. 29, 1913.
1,095,343.
Patented May 5, 1914.
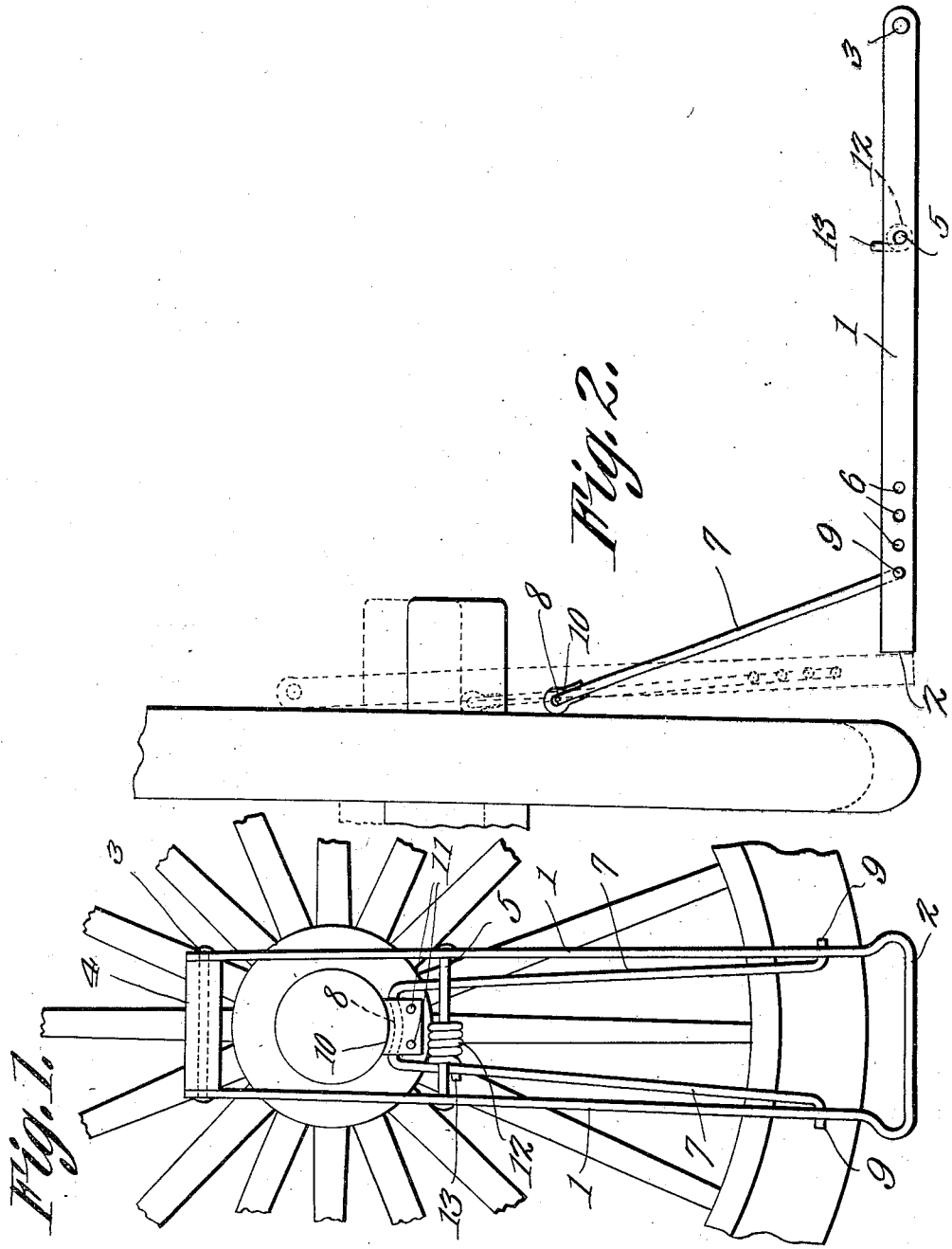
Witnesses
F. B. Wooden.
S. Willson.
Herman G. Metzig
Inventor,
by C. A. Snow & Co.
Attorneys.

UNITED STATES PATENT OFFICE.

HERMAN G. METZIG, OF BERLIN, WISCONSIN.

AUTOMOBILE WHEEL-JACK.

1,095,343.  Specification of Letters Patent.  Patented May 5, 1914.

Application filed August 29, 1913. Serial No. 787,343.

*To all whom it may concern:*

Be it known that I, HERMAN G. METZIG, a citizen of the United States, residing at Berlin, in the county of Green Lake and State of Wisconsin, have invented a new and useful Automobile Wheel-Jack, of which the following is a specification.

The present invention appertains generally to vehicle jacks, and relates more particularly to a jack for automobiles or pneumatic-tired wheels.

It is the object of the present invention to provide a novel and improved jack for raising the wheels of an automobile, when the automobile is idle or out of use, in order that the pneumatic tires may be relieved of the strain due to the weight of the machine, whereby the life of the tires may be lengthened materially.

Another object of the present invention is to provide a jack of the nature indicated, which shall be of such peculiar construction as to best adapt it for the purposes intended, and in order to carry out the results desired, in an efficacious manner.

It is also within the spirit of the invention, to provide a device of the nature specified which shall be of comparatively simple, compact and inexpensive construction, as well as being convenient and efficient in its use.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is an elevation of the improved jack, as applied to an automobile wheel. Fig. 2 is a side elevation of the jack prior to application to the wheel, and illustrating the parts of the jack in final position in dotted lines.

The present device embodies in its essentials two members or elements, namely, a lever, and a thrust or lifting member. These elements are each of a peculiar construction, and are operably connected in such a manner as to carry out the functions desired in a highly efficient manner.

Referring specifically to the drawing, the lever is constructed from a bar or strap of suitable metal, which is doubled to provide the arms 1, and the base or shoe 2 connecting the lower ends of the arms 1. The arms 1 preferably converge toward their upper or free ends, and their free ends are connected by a cross bar 3, on which a wooden or other suitable handle 4 is rotatably mounted between the ends of the arms 1. The arms 1 are connected intermediate their ends, by a cross bar or stay 5, the ends of the members 3 and 5 being preferably riveted through the arms 1. Below the cross bar or member 5, each arm 1 is provided with a series of apertures or holes 6, which extend upwardly from the shoe or base 2.

The thrust or lifting member is fashioned from a rod or suitable length of metallic stock, which is doubled to form the arms 7, and the curved or arcuate yoke 8 connecting the arms at one end. The arms 7 preferably diverge away from the yoke 8, and are provided at their free ends with the angular portions 9 bent away from each other, which are designed to snap outwardly through the respective apertures 6 to pivot the thrust member between the lever arms or to the inner sides thereof. It is evident that by engaging the angular ends 9 of the arms 7 through the various apertures 6, the thrust or lifting member may be adjusted with respect to the lever. The arcuate yoke 8 provides a hub seat, and is padded by means of a leather or similar facing 10 wrapped thereover, the ends of the covering or facing 10 being attached by means of rivets or other securing members 11. The ends of the pad or covering 10 are preferably disposed between the arms 7, to expose the intermediate or unencumbered portion of the pad to the hub, as will hereinafter appear. A latch is carried by the cross bar 5 of the lever, and embodies a wire coil 12 loosely embracing the cross bar 5, and having one terminal formed into a hook 13 to engage one arm 7 of the thrust or lifting member.

In use, the thrust or lifting member is first adjusted properly with respect to the lever, to accommodate the particular diameter or size of the automobile wheel which is to be raised, and the padded seat is then engaged under the outer end of the wheel hub, as suggested in Fig. 2, with the base 2 of the lever resting on the floor or underlying surface below the hub. The free end of the lever is then swung upward, by hand, through the medium of the handle 4, until the free end of the lever, or handle 4, is brought against the spokes of the wheel. The latch mounted on the cross bar 5 is then slipped or moved into engagement with the respective arm 7 of the thrust member, which will lock the jack in position against the vehicle wheel. It is to be noted that when the lever is raised or swung upward, the thrust member will be raised or elevated, so as to lift or raise the vehicle wheel above the floor or underlying surface, so that the pneumatic tire will be relieved of the weight of the machine. Attention is also called to the fact that the hub of the wheel is adapted to be received between the arms of the lever, and between the handle 4 and cross rod 5 of the lever, in order that the handle 4 may swing against the upper spokes of the wheel. It is also to be observed that the lever and thrust member are each of U-shape, the terminals of the thrust member being adjustably engageable with the arms of the lever, the intermediate portion of the lever forming a foot or base to engage the floor, while the ends of the lever are connected by a handle, and while the intermediate portion of the thrust member is formed into a seat or hub-engaging portion.

Attention is directed to the fact that the lever is relatively long, while the thrust member is relatively short, in order that the free end of the thrust member, which is provided with the hub seat, will terminate short of the handle 4 or the terminals of the lever. Thus, when the lever is raised, as seen in Fig. 1, the terminal portions of the lever are adapted to receive the hub engaged by the hub seat, to assist in maintaining the jack in position with respect to the hub. Thus, the hub will be disposed between the arms or terminal portions of the lever, and between the hub seat and handle.

In practice, one of the improved jacks is employed in connection with each of the wheels of an automobile, in order that the entire machine may be raised, to relieve all of the pneumatic tires of the weight of the machine. The construction of the device is such, that it will not injure the finish of the hubs or spokes when jacking up the wheels, or when the jacks are removed, so as to permit the machine to gravitate onto the floor. The said jacks may be readily and effectively applied to the wheels of a vehicle, and carry out the objects aimed at in a satisfactory and desirable manner.

Having thus described the invention what is claimed as new is:—

1. In a jack, a U-shaped lever, a thrust member having one end pivoted between the arms of the lever, the free end of the thrust member being provided with a hub seat and terminating short of the terminals of the lever whereby the hub may be received between the arms of the lever, and the intermediate portion of the lever being formed into a foot.

2. In a jack, a relatively long U-shaped lever and a relatively short thrust member, the terminals of the thrust member being pivoted to the inner sides of the arms of the lever, the intermediate portions of the lever and thrust member being formed into a foot and hub seat, respectively, and a handle connecting the terminals of the lever, the terminal portions of the lever being arranged to receive a hub engaged by the hub seat.

3. In a jack, a U-shaped lever and a U-shaped thrust member, the intermediate portions of which are formed into a foot and hub seat, respectively, the arms of the lever having a series of apertures, the terminals of the thrust member bent angularly away from each other to snap outwardly through the said apertures, and a handle connecting the terminals of the lever, the terminal portions of the lever being arranged to receive a hub engaged by the hub seat.

4. In a jack, a lever embodying two spaced arms connected at one end by a foot, and connected at the other end by a handle, and a thrust member pivoted at one end between the arms of the lever adjoining the foot and having a hub seat at its free end, the free end of the thrust member terminating short of the handle, whereby a hub engaged by the hub seat may be received between the lever arms and the handle and hub seat.

5. In a jack, a doubled bar forming a lever, and having its intermediate portion formed into a foot, a handle connecting the ends of the bar, a doubled rod forming a thrust member having its ends pivoted to the inner sides of the arms of the said bar and having its intermediate portion formed into a hub seat, the thrust member being relatively short so that its free end terminates short of the handle, and a cross rod connecting the arms of the lever and arranged to engage the arms of the thrust member.

6. In a jack, a U-shaped lever and a U-shaped thrust member, the intermediate portions of which are formed into a foot and hub seat, respectively, the terminals of the thrust member pivotally engaging the arms of the lever, a handle connecting the terminals of the lever, a cross rod connecting the arms of the lever and arranged to engage the arms of the thrust member, and a latch mounted on the said cross rod and engageable with one arm of the thrust member.

7. In a jack, a lever embodying a doubled bar, the intermediate portion of the bar being bent to form a foot, and each arm of the bar having a series of apertures, a handle connecting the terminals of the said bar, a cross rod connecting the arms of the bar intermediate their ends, a thrust member comprising a doubled rod having its terminals bent angularly to snap into engagement with the said apertures, the intermediate portion of the said rod being arcuate to form a hub seat, and a latch embodying a wire coil embracing the said cross rod and having one terminal formed into a hook to engage one arm of the said rod.

In testimony that I claim the foregoing as my own, I have hereto affixed my signature in the presence of two witnesses.

HERMAN G. METZIG.

Witnesses:
HARRY C. WOOD,
ALICE MURPHY.